United States Patent
Sternberg et al.

(10) Patent No.: US 10,750,126 B2
(45) Date of Patent: Aug. 18, 2020

(54) SYSTEMS AND METHODS OF MEASURING QUALITY OF VIDEO SURVEILLANCE INFRASTRUCTURE

(71) Applicant: VIAKOO, INC., Mountain View, CA (US)

(72) Inventors: Alex Sternberg, Forestville, CA (US); David Nelson-Gal, Palo Alto, CA (US); Jason Banich, Menlo Park, CA (US); Eric Green, Santa Clara, CA (US); Manqing Liu, Los Gatos, CA (US)

(73) Assignee: VIAKOO, INC., Mountain View, CA (US)

( * ) Notice: Subject to any disclaimer, the term of this patent is extended or adjusted under 35 U.S.C. 154(b) by 901 days.

(21) Appl. No.: 14/495,407

(22) Filed: Sep. 24, 2014

(65) Prior Publication Data

US 2015/0085115 A1    Mar. 26, 2015

Related U.S. Application Data

(60) Provisional application No. 61/881,670, filed on Sep. 24, 2013.

(51) Int. Cl.
*H04N 17/00* (2006.01)
*H04N 7/18* (2006.01)

(52) U.S. Cl.
CPC ............ *H04N 7/18* (2013.01); *H04N 17/004* (2013.01)

(58) Field of Classification Search
CPC ........................................................ H04N 7/18
USPC ........................................................ 348/143
See application file for complete search history.

(56) References Cited

U.S. PATENT DOCUMENTS

| | | | |
|---|---|---|---|
| 7,519,504 B2 | 4/2009 | Goldman et al. | |
| 7,523,092 B2 | 4/2009 | Andreev et al. | |
| 8,548,297 B2 | 10/2013 | Pashkevic et al. | |
| 9,674,562 B1* | 6/2017 | Spracklen | H04N 21/242 |
| 2006/0129518 A1* | 6/2006 | Andreev | G06F 8/24 |
| 2006/0167672 A1* | 7/2006 | Goldman | G08B 13/19656 703/13 |
| 2010/0208064 A1* | 8/2010 | Liu | G08B 13/19667 348/143 |
| 2012/0114314 A1* | 5/2012 | Pashkevich | H04N 5/91 386/328 |

(Continued)

OTHER PUBLICATIONS

International Search Report and Written Opinion dated Feb. 19, 2015 for PCT/US2014/065039.

*Primary Examiner* — Amir Shahnami
(74) *Attorney, Agent, or Firm* — The Marbury Law Group, PLLC

(57) ABSTRACT

One or more key performance indicators are necessary to properly measure the health of video surveillance applications and the supporting infrastructure. Some of the key performance indicators include: Video Path Uptime (VPU), Video Stream Delivery Index (VSDI), and, Video Retention Compliance (VRC). From these metrics, it is possible to calibrate whether a surveillance infrastructure is operating properly. These metrics can be used to properly alert video network administrators of problems that are actually affecting the video surveillance application. It is also possible to use these metrics to build better analytics to determine root cause of problems as well as build prediction models for potential problems before they occur.

27 Claims, 3 Drawing Sheets

(56) References Cited

U.S. PATENT DOCUMENTS

2013/0024429 A1* 1/2013 Raas .................. G06Q 10/10
707/689
2013/0336627 A1* 12/2013 Calvert .............. H04L 65/4084
386/224

* cited by examiner

SYSTEMS AND METHODS OF MEASURING QUALITY OF VIDEO SURVEILLANCE INFRASTRUCTURE

CROSS-REFERENCE TO RELATED APPLICATIONS

This application claims the benefit under 35 USC 119(e) of prior co-pending U.S. Provisional Patent Application No. 61/881,670, filed Sep. 24, 2013, the disclosure of which is hereby incorporated by reference in its entirety.

TECHNICAL FIELD

The present application relates to video surveillance in general. More specifically, the present application discloses monitoring quality of video data in a video surveillance infrastructure.

BACKGROUND OF THE RELATED ART

A typical video surveillance application comprises many cameras, camera network switches, recording servers, storage system and video management software (VMS). The goal of this kind of application is to provide situational awareness not only allowing a small number of individuals (e.g., guards) to monitor a broad expanse of physical plant and/or property, but also to provide a recoverable record of events that might have occurred. This capability helps to better understand what happened and facilitates recovery, arbitration of disputes and improvement of flawed procedures. Therefore, one of the most important goals is to make sure that video streams from cameras are recorded properly onto storage systems. Often, video streams are not recorded due to component failures or software errors, or configuration mistakes. Additionally, it is possible that some frames of video fail to reach storage due to congestion in network paths, congestion on servers (e.g., not enough processing power) or storage performance (e.g., limited write input output operations per second (IOPS)). This leads to gaps in the video, potentially at critical moments. Another problem is the premature deletion of video files to make room for new video data due to system storage limitations or, worse, malicious deletion of video evidence. The consequences are that critical moments of video data are not available as expected when investigators attempt to retrieve them.

Up until now, figuring out if the video streams are properly recorded has been a complex manual process. Existing network monitoring tools provide a large number of measures but don't accurately identify whether each video stream is working properly, recording completely and being retained for the intended period of time. The best they can do is to identify more obvious situations where physical devices fail completely. Worse, some tools bombard users with false alarms or large numbers of complex signals, including excess amount of non-essential information (noise). The result is that users don't know what to pay attention to or what it truly means. As a consequence, even the most sophisticated operations are forced to use human resources to manually check that each camera and associated video streams are okay on some periodic basis. This checking process requires viewing and playing back the recorded videos on each camera stream as well as validating that recordings are saved for the intended retention cycle.

Invariably, because these manual operations are imperfect or because human limitations cannot keep track of all the camera and video streams effectively enough, many operations only discover a problem with missing video data only after an event has occurred. At that point, the video isn't available, it is too late and the data is lost and the value of the investment in video surveillance infrastructure is diminished.

The present disclosure illustrates methods of creating definite metrics for video surveillance applications that address these problems, leading to better operational awareness and better efficacy. The disclosure also provides a mechanism that can proactively alert users when there are real issues associated with these video surveillance applications, helping people responsible for the infrastructure to focus only when the applications need servicing attention.

SUMMARY

Key performance indicators (KPI) that are necessary to properly measure the health of video surveillance applications and the supporting infrastructure are disclosed. The performance indicators include: Video Path Uptime (VPU), Video Stream Delivery Index (VSDI), and, Video Retention Compliance (VRC). From these metrics, it is possible to calibrate whether the surveillance infrastructure is operating properly. These metrics can be used to properly alert video network administrators of problems that are actually affecting the video surveillance application. It is also possible to use these metrics to build better analytics to determine root cause of problems as well as build prediction models for potential problems before they occur.

BRIEF DESCRIPTION OF THE DRAWINGS

The above aspects and other aspects and features will become apparent to those ordinarily skilled in the art upon review of the following description of specific embodiments in conjunction with the accompanying figures, wherein.

DETAILED DESCRIPTION

Figure 1:
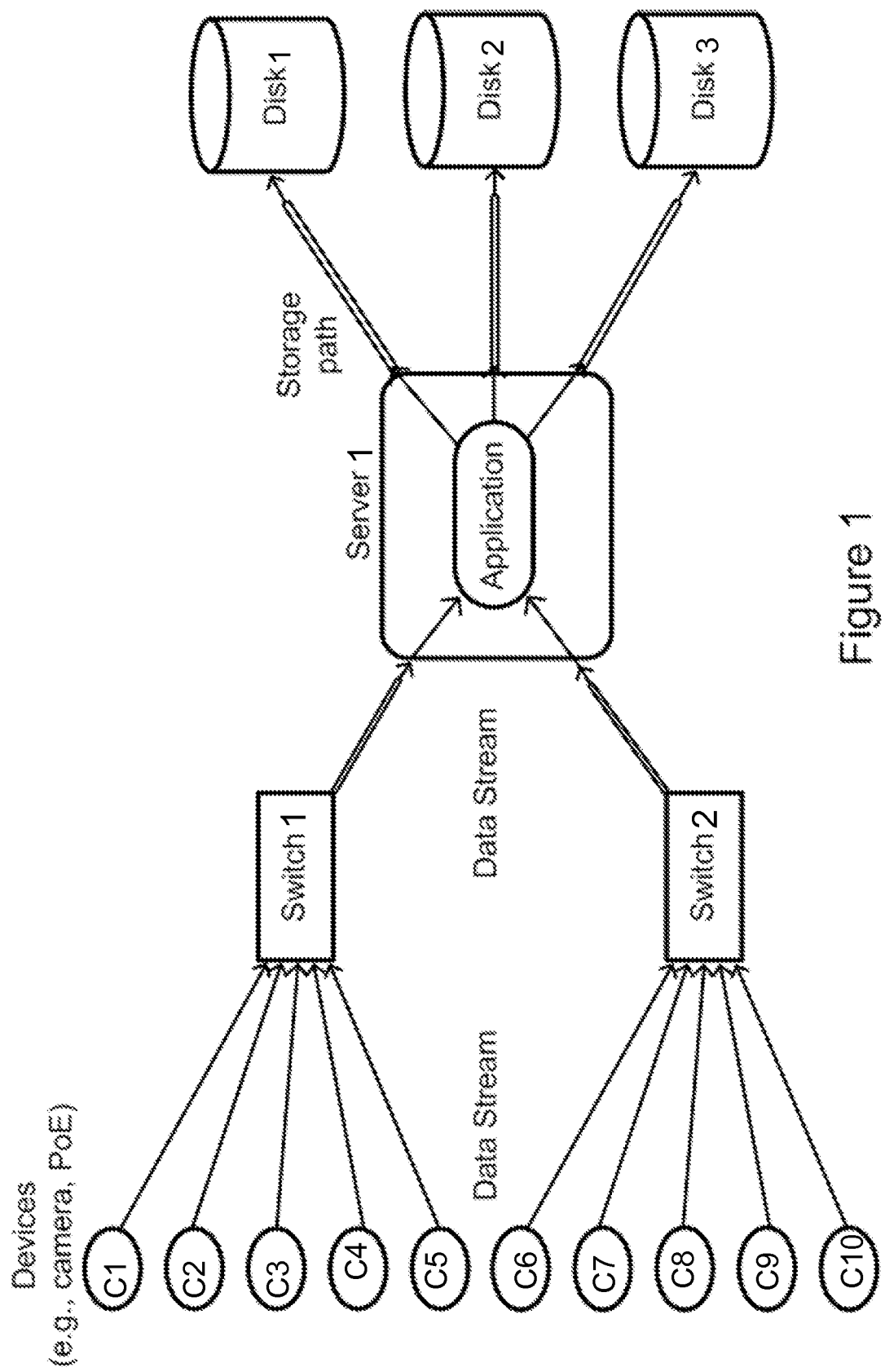
FIG. 1 illustrates a block diagram of an example camera network, whose performance can be monitored utilizing the embodiments of the present invention.

Embodiments will now be described in detail with reference to the drawings, which are provided as illustrative examples so as to enable those skilled in the art to practice the embodiments. Notably, the figures and examples below are not meant to limit the scope to a single embodiment, but other embodiments are possible by way of interchange of some or all of the described or illustrated elements. Wherever convenient, the same reference numbers will be used throughout the drawings to refer to same or like parts. Where certain elements of these embodiments can be partially or fully implemented using known components, only those portions of such known components that are necessary for an understanding of the embodiments will be described, and detailed descriptions of other portions of such known components will be omitted so as not to obscure the description of the embodiments. In the present specification, an embodiment showing a singular component should not be considered limiting; rather, the scope is intended to encompass other embodiments including a plurality of the same component, and vice-versa, unless explicitly stated otherwise herein. Moreover, applicants do not intend for any term in the specification or claims to be ascribed an uncommon or special meaning unless explicitly set forth as such. Further, the scope encompasses present and future known equivalents to the components referred to herein by way of illustration.

Security professionals invest a significant amount of resources in deploying video surveillance applications that range from the capital costs of cameras, servers, storage and networking to the effort and expertise in deploying video management software and configuring the solution to do the job that key stakeholders expect. The word 'camera' has been used to encompass any video capturing device.

Present inventors have developed key metrics for video surveillance application that answers fundamental questions that a distributed solution requires. Some of the fundamental questions are:

1) whether each video-stream is working properly from camera to storage;
2) whether all the frames from the video streams recorded properly to produce clean and acceptable quality of video; and
3) whether each camera-stream's data retained for as long needed.

The present disclosure proposes a solution based on a number of metrics, including: Video Path Uptime (VPU) (also referred to as Video Path Integrity (VPI)), Video Path Delivery Index (VSDI) (also referred to as Video Stream Quality (VSQ)), and, Video Retention Compliance (VRC). The articulated VPU, VSQ and VRC metrics respectively or collectively answer the above questions. Specifically, VPU reflects whether the video path from a camera to a server, to the application all the way to its storage location is working VSDI reflects whether all the video frames are making it to the storage (also known as "Frame Loss"). VRC reflects whether all the video data is being retained for as long as was specified.

These three metrics are complementary and together they define the overall operational health of a video surveillance infrastructure. From these metrics, people responsible for video surveillance infrastructure can accurately understand whether their systems are working properly and can focus in on components of the surveillance infrastructure that are impacting these metrics adversely. Furthermore, automated analytic mechanisms can use these measures to drive root cause analysis processes and predictive analytics over time. Key personnel, e.g., Chief Security Officers can leverage these metrics to drive operational excellence throughout their operations, getting the value and risk reduction expected from their video surveillance investments.

The three metrics, VPU, VSDI, and VRC are generated for each camera. In an embodiment, the metrics can be aggregated together to create overall metrics for a digital video recording server, a site, or a collection of sites, or an entire enterprise. The site is typically a single physical location where all components are located. This maybe a single store, a building or a collection of buildings and grounds located in a common geographic area. However, the methods and systems disclosed here are suitable for multiple physical locations or sites as well.

For each metric, the process requires measuring the current state of the infrastructure at regular intervals. Each sample measurement collects metrics about the infrastructure either as an instantaneous measure (live) or as an accumulated count since the last sample was taken. Trend metrics plot these metrics from one sample to the next, providing a long-term view of how surveillance infrastructure behaves over time.

Below, details of the three metrics are elaborated under separate sub-headings. Persons skilled in the art would appreciate that the metrics are complementary to each other, and if required, can be combined with other metrics to generate meaningful information about health of video surveillance infrastructure.

Video Path Uptime (VPU)

Figure 2:
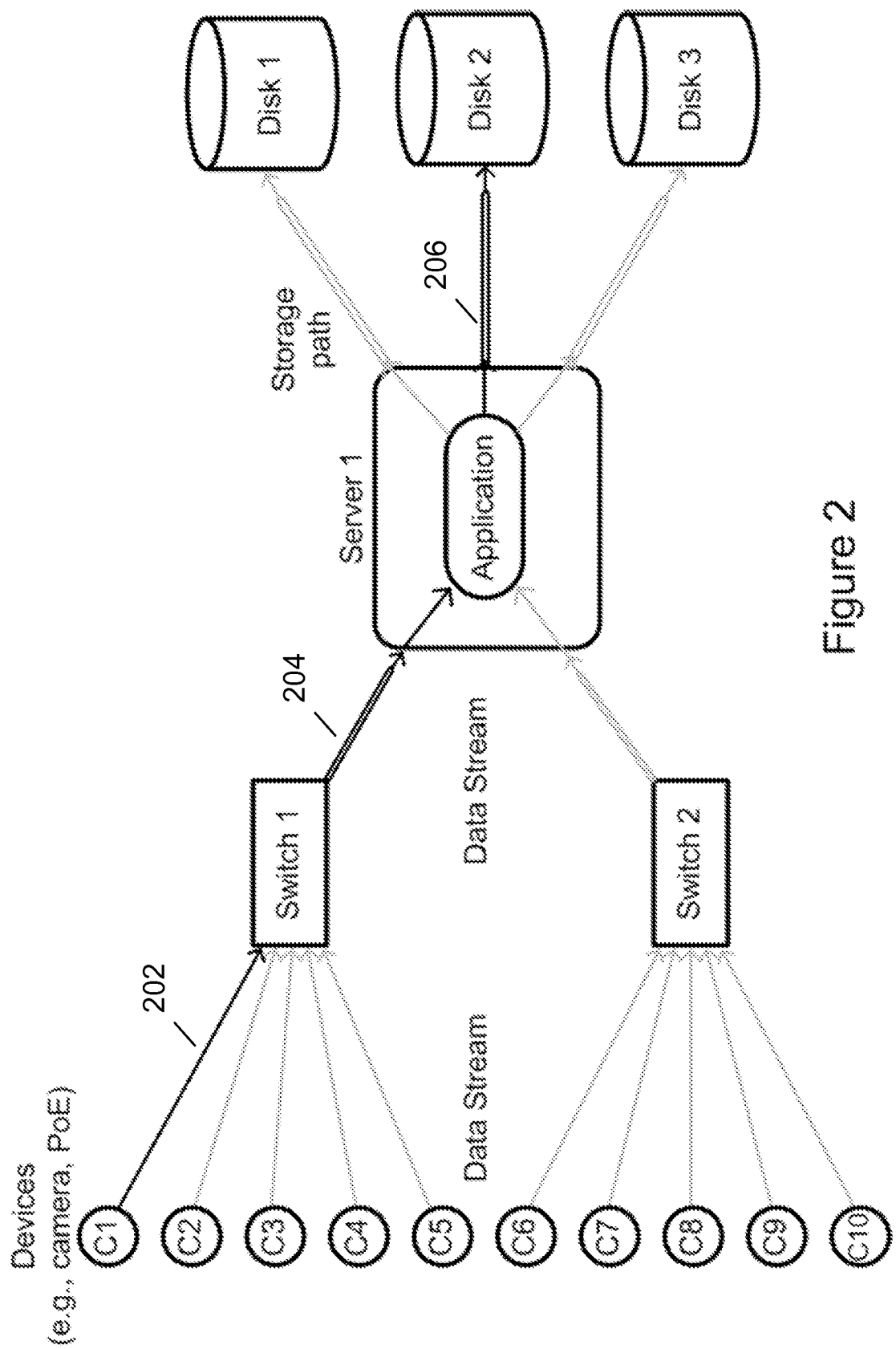
FIG. 2 illustrates a single data stream path for device C1 shown in FIG. 1.

VPU measures the end-to-end availability of end-to-end video data stream (sometimes also called a 'video data path' or 'camera stream') from camera to storage media. A video data stream may have multiple components, such as an incoming video data stream coming from a camera to a server (may be via a switch), and an outgoing video data stream going from the server to a storage device via a storage path. One of the major goals of VPU is to communicate whether camera streams are recording as designed. This metric is, at its core, an aggregation of measures of a distributed relationship where every element of that relationship has to be working for the overall measure to considered working correctly (i.e, the logic outcome is 'TRUE'). In the example camera network in FIG. 1, there is a collection of devices (e.g., cameras labeled C1-C10), which are the points of entry in a Power over Ethernet (PoE) network including the respective video paths. The cameras are streaming data through one or more switches (such as, switch 1, switch 2) to one or more servers (such as server 1). Within the server(s), there are applications that process the data and store it in storage devices such as Disks 1-3. A device like a camera can have one or more streams of data. To understand the performance of the overall surveillance infrastructure, it is needed to aggregate a metric for each camera stream. Also, persons skilled in the art will appreciate that any number of switches, servers, applications, and/or storage devices can be used. FIG. 2 shows a single illustrative data stream path for camera Cl, going through switch 1 (via path 202) to server 1 (via path 204). The processed data then is routed to storage device Disk 2 via storage path 206. The data paths may dynamically vary for efficient load balancing and processing. For example, path 202 may lead to switch 2 if switch 1 is overloaded, switch 2 will send the data stream to an appropriate server, and path 206 may lead to Disk 1 or Disk 3 if Disk 2 is temporarily full. Other possible data paths are 'greyed out' in FIG. 2 to highlight a particular data path used in a configuration. However, the idea is that the data stream path is configurable and changeable without moving away the scope of the current disclosure.

For each stream of data, the constituent components of the stream from the perspective of the service are monitored. The end goal is to successfully receive the data stream and write it to its proper location in storage.

Therefore, based on the aliveness of all components in the surveillance infrastructure, any component failure in the video stream path will cause VPU for that path to degrade or fail completely, i.e. VPU metric value becomes equal to zero. VPU is defined as the end-to-end stream-uptime percentage.

Given recording schedule, when videos are recording properly for a single camera stream i, $VPU_i=1$. Otherwise, if video is failing to record for any reason, $VPU_i=0$. It is noteworthy here that a healthy camera stream that is not sending video data due to lack of motion detection (i.e. sends no data because there is no change of scene) is still considered a $VPU_i=1$. Therefore, a zero value of VPU definitively indicates a failure, as detected by the algorithm. These failures may be because of any one of the following from the non-limiting illustrative list:
- Camera is not alive;
- Network connection is severed;
- Server is down;
- No network sessions between video management software (VMS) and camera;
- Storage media is not available;
- VMS recording service is not running.

An aggregated VPU score for a collection of cameras is expressed as follows:

$$\sum_{i=1}^{n} \frac{VPUi}{n}$$

For example, the VPU of a server X would have a $VPU_X$ equal to the sum of all $VPU_i$ values of all the cameras (e.g., 'n' number of cameras) recording to that server divided by the number of cameras recording to that server. Similarly, the VPU for an entire site would be the sum of all camera stream VPU values in that site divided by the number of camera streams within that site.

This calculation is done for a single measure and has a scalar value, which can be calculated at any moment in time. However, VPU becomes most valuable when measured repeatedly over the course of time in regular intervals. From this, it is possible to predict a trend of whether the overall health of a camera, server, site or organization is stable, improving or decaying. More importantly, this becomes a key performance indicator (KPI) that is critical to quality for customers and from which once can correlate predictive analytics and root cause analysis.

Video Stream Delivery Index (VSDI)

VSDI measures the performance impact of saturation or decay of a video network on video quality. This is different from VPU in that VPU measures camera streams that are in a failed state. VSDI measures the health of camera streams that are still recording data but due to problems, are decaying in the quality of video that is getting recorded. This is because, unlike typical network traffic which provides some guarantee of delivery of data sent along a TCP/IP socket connection, video streams end data using protocols that are tolerate some loss of data to favor keeping up, in real time, with the data stream.

Specifically, this decay can result in dropped packets, which in turn can cause one or more frames if video to be lost due to inter-frame dependencies. Additionally, system performance and storage performance can lead to greater and greater queue depth on IO paths, eventually leading to dropped frames as well.

For example, normal operation for a camera might be configured to generate a video stream at 8 frames a second at a resolution of 4 Mega pixels. At maximum resolution and throughput, this could produce a data stream of well over a Gigabyte of data per minute. Compression and motion detection can significantly reduce this. However, it can be quite significant. Compound this with a surveillance infrastructure connected to dozens if not hundreds of cameras and the stress on networking, compute and storage resources can be tremendous.

Still, these loads can be calculated in advance and enough capacity can be configured into the system to handle it. However, over time, changes to the configuration can put capturing all the video at risk. Typical problems can be associated with people adding cameras to the configuration without understanding their impact to the original design. Another cause can be people changing the configuration of cameras (e.g., increasing the resolution, changing the codec or increasing the frame-rate), causing them to produce more data then solution was designed to handle.

Furthermore, people can inadvertently add software to servers or change performance parameters causing servers to become loaded. Finally, systems can decay causing noise on the critical network paths, lower performance or increases in latency associated with storage. All these can affect the performance of the surveillance infrastructure and create risk for video stream quality.

VSDI is a measure that reflects these problems. As with VPU, each camera stream has a VSDI measure and then this VSDI measure can be aggregated in logical groups of camera streams, either by server, by site, by company or any other collection users choose to evaluate their infrastructure. Like VPU, VSDI is a percentage, its lowest possible value being 0, which implies the system has detected frame loss for that sample. Furthermore, a value of 100% implies all the frames of video have been transmitted successfully. Unlike VPU, VSDI for a single video stream could have other values that are greater than zero (0%) but less than 100%. This is to reflect the property that there may not be frame loss yet, however, the system is detecting varying degrees of risk to an individual video stream path. For example, a VSDI value of 80% may occur because the system is starting to see a CPU load exceed 80%. It doesn't mean video frames have been lost but it is starting to become a risk. A rising storage queue depth over the course of several measures could also reduce the VSDI as well or drop packet events from the network that are still within acceptable ranges. A VSDI of 20% implies that the infrastructure is getting pushed to its capacity and dropped frame events are eminent and may have already occurred.

As before, VSDI becomes another KPI which can be used to correlate information from multiple sources to get to root cause and develop predictive analytics about what the problem might be in a user's infrastructure and perhaps early detection or prediction of failures so users can take steps to ameliorate the problem or add more resources to their infrastructure to accommodate the actual traffic before they start losing data. Given as a percentage between 0%-100%, these values can be aggregated to create overall metrics for a collection of camera streams recording to the same media, or flowing through the same server or across an entire site.

Video Retention Compliance (VRC)

Any video surveillance recording system has physical capacity, which sets some upper limits as to the amount of video data can be recorded. For practical reasons, when these systems run out of space, they must delete older video data to create room for newer video data. This is a necessary and acceptable strategy since most of the video data is somewhat worthless if nothing important has happened. For example, a video stream of an unused or rarely used back door to a facility doesn't need to be saved in perpetuity if nothing has ever happened that is worth watching. The time between when the video stream data is first captured to the moment it has to be deleted to make room for new video is called the retention period. Within an organization, key stakeholders such as the Chief Security Officer or the CEO may have an expectation of how long this video should be retained which was used to justify the purchase of enough storage to accommodate this expectation. In some cases, regulatory agencies or expectations imposed by customers have established standards for how long this data must be preserved for their own auditing of operations.

This video retention period is a key dimension of the design of the system and has a significant impact on costs, i.e., more retention time implies more storage. At a basic level, the retention period represents the time an organization has to evaluate whether something has happened that would warrant archiving video clips of interest to be saved more permanently. For example, if a system saved video data for only 48 hours, one may find that a break-in that happened to a warehouse on Friday evening would already have been overwritten when it is discovered on Monday morning.

Different camera streams may also have different objectives. For example, for physical security, exterior camera views of a facility may only need to be retained for as long as it takes to discover perimeter security breaches and then perform an investigation, anywhere from 2 to 4 weeks. However, regulations around a pharmaceutical manufacturing line may require retention of data for up to six months, which allows for bad lots to be discovered and then traced back to the manufacturing sequence that might have produced it. Cameras monitoring access to Data Centers that store financial information can have retention windows of several months. A typical retention period may be six months. Saving all camera streams for the maximum retention period simply because some camera streams need to be saved for that long is extremely expensive. Moreover, different jurisdictions (for example, different countries) may have explicit deletion policies associated with video data that might be capture people in a public setting who have an expectation of privacy. In these cases, governments may have strict limits for how long these video data can be retained. As a result, many organizations will have different policies on different streams.

Unfortunately, the retention period is not necessarily static. As mentioned before, changes that can affect Video Stream Delivery Index (VSDI) can also affect retention periods. To verify compliance however, traditional measures do not help. Free space is inadequate. Furthermore, measuring the oldest file at any one moment in time fails because some camera streams maybe in compliance with their retention goals while others may not be. Moreover, for certain systems, the presence of an errant file can make the system look like it is retaining data for a long time when actually on going storage associated with a particular video stream could be well below its requirements. As a result, the only way for even the most sophisticated organizations to verify that they are in compliance with goals is to have employees periodically verify each camera, one-at-a-time, to make sure it is still retaining data according to the stated goals. This is expensive and prone to human errors in measurement, especially over time.

Therefore, to effectively measure compliance, one must automatically monitor storage utilization history on a per video-stream basis. From this information, one can see how much data is getting stored with any one particular camera stream on a daily basis and detect when that data starts to get deleted to create space. Measuring the system this way allows us to identify the difference between ongoing retention of video stream data versus the errant file that has been left behind but doesn't represent ongoing retention. It can also detect the errant premature deletion or the failure to delete data according to the retention policy. From this information, one can calculate the actual retention period, $R_i$, in terms of retention time for any camera stream, $C_i$.

To compare camera streams across a collection, it is important to normalize each stream against its individual Retention Goals ($RG_i$). Therefore, to calculate Video Retention Compliance for any camera, the following formula is used for each camera stream:

$$VRC_i = R_i/RG_i$$

Unlike VPU and VSDI, a single video stream can actually have a $VCR_i$ value which is greater than 100%, which reflects a situation where the data exceeds the retention goal. When a collection of camera streams is looked at, VRC doesn't just aggregate in averages as a camera stream that significantly exceeds its retention goal could start hiding problems in other streams not meeting their retention goals. Rather, when normalizing, one uses a maximum value of 100% for any camera stream that is exceeding its goal when the streams are aggregated together. This keeps the aggregate measure between 0% and 100% which facilitates subsequent roll-ups at server, site or company levels. Therefore, for a collection of cameras, $$S = \{C_1, C_2, \ldots, C_i, C_{i+1}, C_n\}$$

The overall Video Retention Compliance score of this collection would be as follows:

$$VRC_S = \sum_{i=1}^{p} \frac{\text{MIN}(VPIi, 100\%)}{p}$$

Therefore, the VRC for a site, achieves 100% only if all of the video streams are retained for a least as long as their respective retention goals. This measure also allows us to alert on individual streams that are exceeding or missing their goals.

One can obtain the VRC of a camera stream by understanding where the VMS is storing the data, often referred to as "Storage Path." Different VMS softwares use different conventions but often times it is a directory on a mounted volume that is either explicitly given or can be derived from volume, path and camera name conventions. Extracting this information from the VMS then allows us to calculate each camera's actual retention period, R, using the methods indicated above. Retention Goals maybe explicitly indicated in the VMS software or may require operators to manually give it to us. From the two, one can calculate VRC for each camera and, in turn, for arbitrary collections.

Again, VRC, as with VPU and VSDI, provide one or more KPIs to determine root cause and predictive analytics to help customers achieve their goals and address problems before they become disasters.

Figure 3:
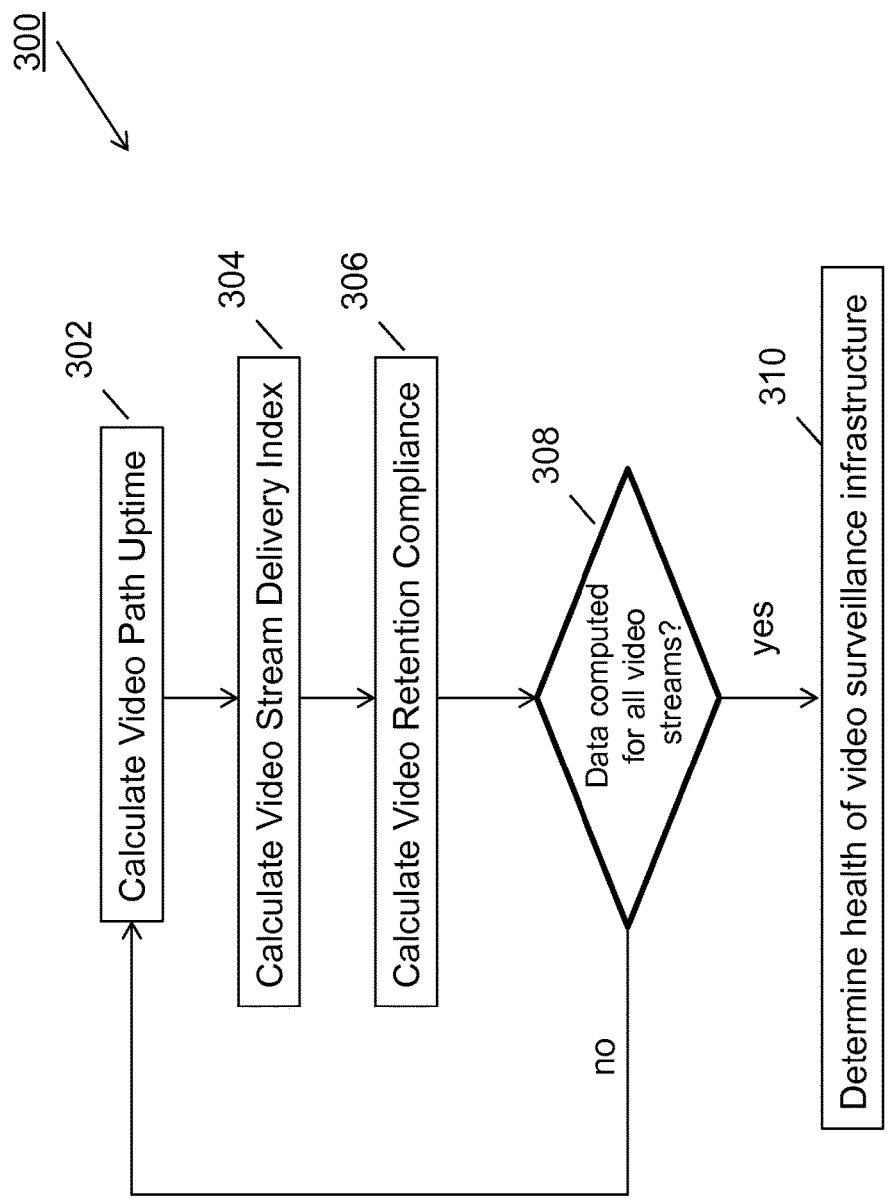
FIG. 3 illustrates a flowchart of a method of measuring quality of video in a video surveillance infrastructure, according to an embodiment of the present invention.

FIG. 3 shows a flowchart 300 that summarizes the method of video data monitoring according to the teaching of this disclosure. In step 302, VPU is calculated for each video stream. As mentioned before, each camera may generate multiple video streams. In step 304, VSDI is calculated for each video stream. In step 306, VRC is calculated for each video stream. These steps are repeated until it is confirmed in step 308 that data has been collected and computed from all video streams in the infrastructure. Then, in step 310, the KPIs are analyzed to determine the overall health of the video surveillance infrastructure.

It is to be appreciated that the steps of the flowchart 300 do not have to occur in any particular order. The three KPIs show different dimensions of overall health of the surveillance infrastructure.

Aspects of the disclosure can be implemented in any convenient form. For example, an embodiment may be implemented by one or more appropriate computer programs which may be carried on an appropriate tangible carrier medium. Embodiments of the disclosure may be implemented using suitable apparatus which may specifically take the form of a programmable computer running a computer program arranged to implement a method as described herein.

The descriptions above are intended to be illustrative, not limiting. Thus, it will be apparent to one skilled in the art that modifications may be made to the embodiments as described without departing from the scope of the claims set out below.

The invention claimed is:

1. A method of determining an effectiveness of a video surveillance infrastructure, comprising: determining, by a processor in a video processing server, a boolean value representing an end-to-end availability of a video stream from a video capture device to a storage device; determining, by the processor, a percentage value indicating a performance impact of saturation or decay on a quality of the video stream to be stored in the storage device; determining, by the processor, a ratio between a measured data retention period of the video stream and a retention goal period associated with the video stream; and determining, by the processor, the effectiveness of the video surveillance infrastructure based solely on the determined boolean value representing the end-to-end availability of the video stream, the determined percentage value representing the performance impact of saturation or decay on the quality of the video stream, and the determined ratio between the measured data retention period and the retention goal period.

2. The method of claim 1, further comprising performing, by the processor, at least one of root cause analysis or predictive analysis based on the determined effectiveness of the video surveillance infrastructure.

3. The method of claim 1, further comprising collecting, by the processor, measurements from components in the video surveillance infrastructure at specified time intervals, wherein the boolean value representing the end-to-end availability of the video stream, the percentage value representing the performance impact of saturation or decay on the quality of the video stream, and the ratio between the measured data retention period of the video stream and the retention goal period associated with the video stream are determined, by the processor, based on the measurements collected at the specified time intervals.

4. The method of claim 1, further comprising generating, by the processor, a prediction model for predicting potential failure of the video surveillance infrastructure based on at least on one of the boolean value representing the end-to-end availability of the video stream, the percentage value representing the performance impact of saturation or decay on the quality of the video stream, the ratio between the measured data retention period of the video stream and the retention goal period associated with the video stream, or the determined overall operation health.

5. The method of claim 1, wherein determining the boolean value representing the end-to-end availability of the video stream from the video capture device to the storage device comprises setting to zero the boolean value representing the end-to-end availability of the video stream in response to determining that:
a video capturing device in the video surveillance infrastructure is not functioning;
a network connection in the video surveillance infrastructure has been severed;
a network session between the video capturing device and video management software (VMS) application running on the video processing server has failed;
the storage device is unavailable; or
a recording service in the VMS is not functioning.

6. The method of claim 1, wherein determining the percentage value representing the performance impact of saturation or decay on the quality of the video stream to be stored in the storage device comprises:
determining, by the processor, whether the storage device at least partially failed to receive or store outgoing video data streams processed by a video management software (VMS) application running on the video processing server.

7. The method of claim 1, wherein determining the percentage value representing the performance impact of saturation or decay on the quality of the video stream to be stored in the storage device comprises:
determining, by the processor, whether any video frames are dropped at the storage device; and
determining, by the processor, a risk of loss of video data based on a load of video processing server or a storage queue depth of the storage device.

8. The method of claim 1, further comprising determining, by the processor, the retention goal period based on a data retention policy or jurisdiction.

9. The method of claim 1, wherein determining the ratio between the measured data retention period of the video stream and the retention goal period associated with the video stream further comprises:
determining, by the processor, whether data is deleted prematurely before the retention goal period; and
determining, by the processor, whether data is not deleted after the retention goal period.

10. A server, comprising: a processor configured with processor-executable instructions to perform operations comprising: determining a boolean value representing an end-to-end availability of a video stream from a video capture device to a storage device; determining a percentage value representing a performance impact of saturation or decay on a quality of the video stream to be stored in the storage device; determining a ratio between a measured data retention period of the video stream and a retention goal period associated with the video stream; and determining an effectiveness of a video surveillance infrastructure based solely on the determined boolean value representing the end-to-end availability of the video stream, the determined percentage value representing the performance impact of saturation or decay on the quality of the video stream, and the determined ratio between the measured data retention period and the retention goal period.

11. The server of claim 10, wherein the processor is configured with processor-executable instructions to perform operations further comprising performing at least one of root cause analysis or predictive analysis based on the determined effectiveness of the video surveillance infrastructure.

12. The server of claim 10, wherein the processor is configured with processor-executable instructions to perform operations further comprising collecting measurements from components in the video surveillance infrastructure at specified time intervals, wherein the boolean value representing the end-to-end availability of the video stream, the percentage value representing the performance impact of saturation or decay on the quality of the video stream, and the ratio between the measured data retention period of the video stream and the retention goal period associated with the video stream are determined based on the measurements collected at the specified time intervals.

13. The server of claim 10, wherein the processor is configured with processor-executable instructions to perform operations further comprising generating a prediction model for predicting potential failure of the video surveillance infrastructure based on at least one of the boolean value representing the end-to-end availability of the video stream, the percentage value representing the performance impact of saturation or decay on the quality of the video stream, the ratio between the measured data retention period of the video stream and the retention goal period associated with the video stream, or the determined overall operation health.

14. The server of claim 10, wherein the processor is configured with processor-executable instructions to perform operations such that determining the boolean value representing the end-to-end availability of the video stream from the video capture device to the storage device comprises setting to zero a boolean value representing the end-to-end availability of the video stream in response to determining that:
 a video capturing device in the video surveillance infrastructure is not functioning;
 a network connection in the video surveillance infrastructure has been severed;
 a network session between the video capturing device and video management software (VMS) application running on the video processing server has failed;
 the storage device is unavailable; or
 a recording service in the VMS is not functioning.

15. The server of claim 10, wherein the processor is configured with processor-executable instructions to perform operations such that determining the percentage value representing the performance impact of saturation or decay on the quality of the video stream to be stored in the storage device comprises:
 determining whether the storage device at least partially failed to receive or store outgoing video data streams processed by a video management software (VMS) application running on the video processing server.

16. The server of claim 10, wherein the processor is configured with processor-executable instructions to perform operations such that determining the percentage value representing the performance impact of saturation or decay on the quality of the video stream to be stored in the storage device comprises:
 determining whether any video frames are dropped at the storage device; and
 determining a risk of loss of video data based on a load of video processing server or a storage queue depth of the storage device.

17. The server of claim 10, wherein the processor is configured with processor-executable instructions to perform operations further comprising determining the retention goal period based on a data retention policy or jurisdiction.

18. The server of claim 10, wherein the processor is configured with processor-executable instructions to perform operations such that determining the ratio between the measured data retention period of the video stream and the retention goal period associated with the video stream further comprises:
 determining whether data is deleted prematurely before the retention goal period; and
 determining whether data is not deleted after the retention goal period.

19. A non-transitory processor-readable storage medium having stored thereon processor-executable instructions configured to cause a processor of a server to perform operations, comprising: determining a boolean value representing an end-to-end availability of a video stream from a video capture device to a storage device; determining a percentage value representing a performance impact of saturation or decay on a quality of the video stream to be stored in the storage device; determining a ratio between a measured data retention period of the video stream and a retention goal period associated with the video stream; and determining an effectiveness of a video surveillance infrastructure based solely on the determined boolean value representing the end-to-end availability of the video stream, the determined percentage value representing the performance impact of saturation or decay on the quality of the video stream, and the determined ratio between the measured data retention period and the retention goal period.

20. The non-transitory processor-readable storage medium of claim 19, wherein the stored processor-executable instructions are configured to cause the processor to perform operations further comprising performing at least one of root cause analysis or predictive analysis based on the determined effectiveness of the video surveillance infrastructure.

21. The non-transitory processor-readable storage medium of claim 19, wherein the stored processor-executable instructions are configured to cause the processor to perform operations further comprising collecting measurements from components in the video surveillance infrastructure at specified time intervals, wherein the boolean value representing the end-to-end availability of the video stream, the percentage value representing the performance impact of saturation or decay on the quality of the video stream, and the ratio between the measured data retention period of the video stream and the retention goal period associated with the video stream are determined based on the measurements collected at the specified time intervals.

22. The non-transitory processor-readable storage medium of claim 19, wherein the stored processor-executable instructions are configured to cause the processor to perform operations further comprising generating a prediction model for predicting potential failure of the video surveillance infrastructure based on at least one of the boolean value representing the end-to-end availability of the video stream, the percentage value representing the performance impact of saturation or decay on the quality of the video stream, the ratio between the measured data retention period of the video stream and the retention goal period associated with the video stream, or the determined overall operation health.

23. The non-transitory processor-readable storage medium of claim 19, wherein the stored processor-executable instructions are configured to cause the processor to perform operations such that determining the boolean value representing the end-to-end availability of the video stream from the video capture device to the storage device comprises setting to zero a value representing the boolean value representing the end-to-end availability of the video stream in response to determining that:
 a video capturing device in the video surveillance infrastructure is not functioning;
 a network connection in the video surveillance infrastructure has been severed;
 a network session between the video capturing device and video management software (VMS) application running on the video processing server has failed;

the storage device is unavailable; or a recording service in the VMS is not functioning.

24. The non-transitory processor-readable storage medium of claim 19, wherein the stored processor-executable instructions are configured to cause the processor to perform operations such that determining the percentage value representing the performance impact of saturation or decay on the quality of the video stream to be stored in the storage device comprises:

determining whether the storage device at least partially failed to receive or store outgoing video data streams processed by a video management software (VMS) application running on the video processing server.

25. The non-transitory processor-readable storage medium of claim 19, wherein the stored processor-executable instructions are configured to cause the processor to perform operations such that determining the percentage value representing the performance impact of saturation or decay on the quality of the video stream to be stored in the storage device comprises:

determining whether any video frames are dropped at the storage device; and determining a risk of loss of video data based on a load of video processing server or a storage queue depth of the storage device.

26. The non-transitory processor-readable storage medium of claim 19, wherein the stored processor-executable instructions are configured to cause the processor to perform operations further comprising determining the retention goal period based on a data retention policy or jurisdiction.

27. The non-transitory processor-readable storage medium of claim 19, wherein the stored processor-executable instructions are configured to cause the processor to perform operations such that determining the ratio between the measured data retention period of the video stream and the retention goal period associated with the video stream further comprises:

determining whether data is deleted prematurely before the retention goal period; and determining whether data is not deleted after the retention goal period.

* * * * *